United States Patent
Donohoe

(10) Patent No.: US 11,038,691 B2
(45) Date of Patent: *Jun. 15, 2021

(54) DATABASE PLATFORM FOR MAINTAINING SECURE DATA

(71) Applicant: JJD Software LLC, Saratoga Springs, NY (US)

(72) Inventor: Justin Donohoe, Saratoga Springs, NY (US)

(73) Assignee: JJD SOFTWARE LLC, Saratoga Springs, NY (US)

( * ) Notice: Subject to any disclaimer, the term of this patent is extended or adjusted under 35 U.S.C. 154(b) by 352 days.

This patent is subject to a terminal disclaimer.

(21) Appl. No.: 16/238,840

(22) Filed: Jan. 3, 2019

(65) Prior Publication Data

US 2019/0207769 A1 Jul. 4, 2019

Related U.S. Application Data

(60) Provisional application No. 62/613,174, filed on Jan. 3, 2018.

(51) Int. Cl.
*H04L 9/32* (2006.01)
*G06F 21/60* (2013.01)
(Continued)

(52) U.S. Cl.
CPC ............ *H04L 9/3242* (2013.01); *G06F 21/51* (2013.01); *G06F 21/602* (2013.01);
(Continued)

(58) Field of Classification Search
CPC ....... H04L 9/3242; H04L 9/14; H04L 9/3239; G06F 21/6227; G06F 21/51;
(Continued)

(56) References Cited

U.S. PATENT DOCUMENTS

2007/0297607 A1* 12/2007 Ogura .................. H04N 7/1675
380/239
2009/0287837 A1* 11/2009 Felsher .................. G06Q 10/10
709/229
(Continued)

FOREIGN PATENT DOCUMENTS

WO 2015186820 A1 12/2015

OTHER PUBLICATIONS

Notice of Allowance and Fee(s) Due dated May 1, 2019 for U.S. Appl. No. 15/448,698, filed Mar. 3, 2017; pp. 8.
(Continued)

*Primary Examiner* — Cheng-Feng Huang
(74) *Attorney, Agent, or Firm* — Hoffman Warnick LLC

(57) ABSTRACT

A system, method and program product for implementing a database security platform for providing secure access to private data in an encrypted storage area. A disclosed system includes a database application configured to receive queries from application users requiring access to encrypted private data; a middle security layer callable from the database application to facilitate predefined access to the encrypted private data; a root security layer configured to receive a decryption request from the middle security layer, perform decryption on specified encrypted private data, and return decrypted data to the middleware layer; a hashing system that generates a hash of the middle security layer and root security layer to ensure integrity of the middle security layer and root security layer; and an auditing detection system that detects malicious auditing of parameters.

21 Claims, 5 Drawing Sheets

(51) Int. Cl.
*H04L 9/14* (2006.01)
*G06F 21/64* (2013.01)
*G06F 21/62* (2013.01)
*G06F 21/51* (2013.01)

(52) U.S. Cl.
CPC ...... *G06F 21/6227* (2013.01); *G06F 21/6245* (2013.01); *G06F 21/64* (2013.01); *H04L 9/14* (2013.01); *G06F 21/606* (2013.01); *G06F 2221/2101* (2013.01)

(58) Field of Classification Search
CPC .... G06F 21/602; G06F 21/64; G06F 21/6245; G06F 21/606; G06F 2221/2101
See application file for complete search history.

(56) References Cited

U.S. PATENT DOCUMENTS

| | | | |
|---|---|---|---|
| 2010/0017879 A1* | 1/2010 | Kuegler | G06F 21/14 726/23 |
| 2013/0055380 A1* | 2/2013 | Swann | G06F 21/46 726/18 |
| 2015/0347772 A1* | 12/2015 | Nizami | G06Q 10/0875 707/783 |
| 2016/0048690 A1* | 2/2016 | Tanishima | G16B 50/40 713/193 |
| 2016/0285827 A1* | 9/2016 | Gula | G06F 21/64 |
| 2017/0255784 A1 | 9/2017 | Donohoe | |
| 2018/0232266 A1* | 8/2018 | Ikeda | G06F 9/546 |

OTHER PUBLICATIONS

Non Final Office Action dated Nov. 14, 2018 for U.S. Appl. No. 15/448,698, filed Mar. 3, 2017; pp. 23.

* cited by examiner

DATABASE PLATFORM FOR MAINTAINING SECURE DATA

TECHNICAL FIELD

The subject matter of this invention relates to data security, and more particularly to a platform for securing data stored via an application database.

BACKGROUND

Data security continues to be significant challenge for information contained in application databases. Application databases utilize computer programs whose primary purpose is to enter and retrieve information, and are used in numerous fields, such as government, medical records, accounting, finance, science, web-based services, and so forth. One of the challenges with implementing application databases is the fact that the data often includes private or sensitive information, such as account information, social security numbers, medical records, etc., and such information is available to employees, developers, system administrators, etc. Accordingly, common strategies for handling private data include ensuring that access is password protected and data encryption.

Although it is relatively straightforward to provide password protection and encrypt data contained in such a database to protect user information, problems arise due to the fact that there are often numerous authorized users who have access to the decrypted data. Authorized users, whether acting intentionally or via comprised user credentials, create a significant risk of a data breach. In a typical environment, authorized users may include application users, developers, project managers, and system administrators. Any one of these actors could potentially misuse their credentials to compromise the data.

Most of the cyber security systems that protect data and information are designed such that a single high-level system account can be used to setup, administer, and (if necessary) deactivate the controls. While establishing a very high level of data security at run-time, most such systems are ultimately established by a single high-level account. All the public and secret keys are entered by this account, modified by this account, and can be read by this account. While some systems provide for separation of duties in an attempt to keep one account from being able to administer all parts of the security system, the accounts are ultimately available to be modified by a single high-level system account that can simply reset the credentials to other accounts and thereby control them under a single admin account. With this high-level account, a cyber attacker has the ability to compromise even the most complex and secure data protection systems. This is the actual attack vector utilized in most of the largest data breaches—a high enough level account that can access the entire system is captured and used to dismantle the protections and extract the data.

SUMMARY

Aspects of the disclosure provide a multi-level security platform in which no single entity is capable of compromising data in an application database.

A first aspect discloses a database security platform for providing secure access to private data in an encrypted storage area, comprising: a database application configured to receive queries from application users requiring access to encrypted private data, in which the encrypted private data is not directly accessible by the database application; a middle security layer having a plurality of middleware routines that are callable from the database application to facilitate predefined access to the encrypted private data and return a result to the database application, and wherein the encrypted private data is not directly accessible by the middle security layer and the middle security layer is not directly accessible by application users; a root security layer configured to receive a decryption request from the middle security layer, perform decryption on specified encrypted private data, and return decrypted data to the middleware layer, wherein the decryption requires both a root key stored in root security layer and a middleware key provided by the middle security layer with the decryption request; a hashing system that generates a hash of the middle security layer and root security layer and compares the hash to a previously generated hash to ensure integrity of the middle security layer and root security layer; and an auditing detection system that detects malicious auditing of parameters being passed between the middle security layer and root security layer.

A second aspect discloses a computer program product stored on a computer readable storage medium, which when executed by a computing system, provides a database security platform for providing secure access to private data in an encrypted storage area, comprising: program code for implementing a database application configured to receive queries from application users requiring access to encrypted private data, in which the encrypted private data is not directly accessible by the database application; program code for implementing a middle security layer having a plurality of middleware routines that are callable from the database application to facilitate predefined access to the encrypted private data and return a result to the database application, and wherein the encrypted private data is not directly accessible by the middle security layer and the middle security layer is not directly accessible by application users; program code for implementing a root security layer configured to receive a decryption request from the middle security layer, perform decryption on specified encrypted private data, and return decrypted data to the middleware layer, wherein the decryption requires both a root key stored in root security layer and a middleware key provided by the middle security layer with the decryption request; program code that generates a hash of the middle security layer and root security layer and compares the hash to a previously generated hash to ensure integrity of the middle security layer and root security layer; and program code that detects malicious auditing of parameters being passed database security platform.

A third aspect discloses a computerized method for implementing a database security platform, comprising: computerized method for implementing a database security platform, comprising: maintaining private data in an encrypted storage area; providing an application database, a middleware security layer and a root security layer; receiving a query at the application database that requires a request for private data; generating a hash of the middleware security layer and the root security layer; comparing the hash to a previously generated hash to verify the middleware security layer and the root security layer; verify that no active auditing is detected for parameters passed among the application database, a middleware security layer and a root security layer; passing the request for private data to the middle security layer; processing the request with a middleware routine at the middle security layer and submitting a decrypt request along with a middleware key to the root security layer; retrieving and decrypting requested private data within the root security layer using a stored root key and the submitted middleware key; passing decrypted private data to the middleware routine; and returning an decrypted result to the database application.

BRIEF DESCRIPTION OF THE DRAWINGS

These and other features of this invention will be more readily understood from the following detailed description of the various aspects of the invention taken in conjunction with the accompanying drawings in which.

Figure 1:
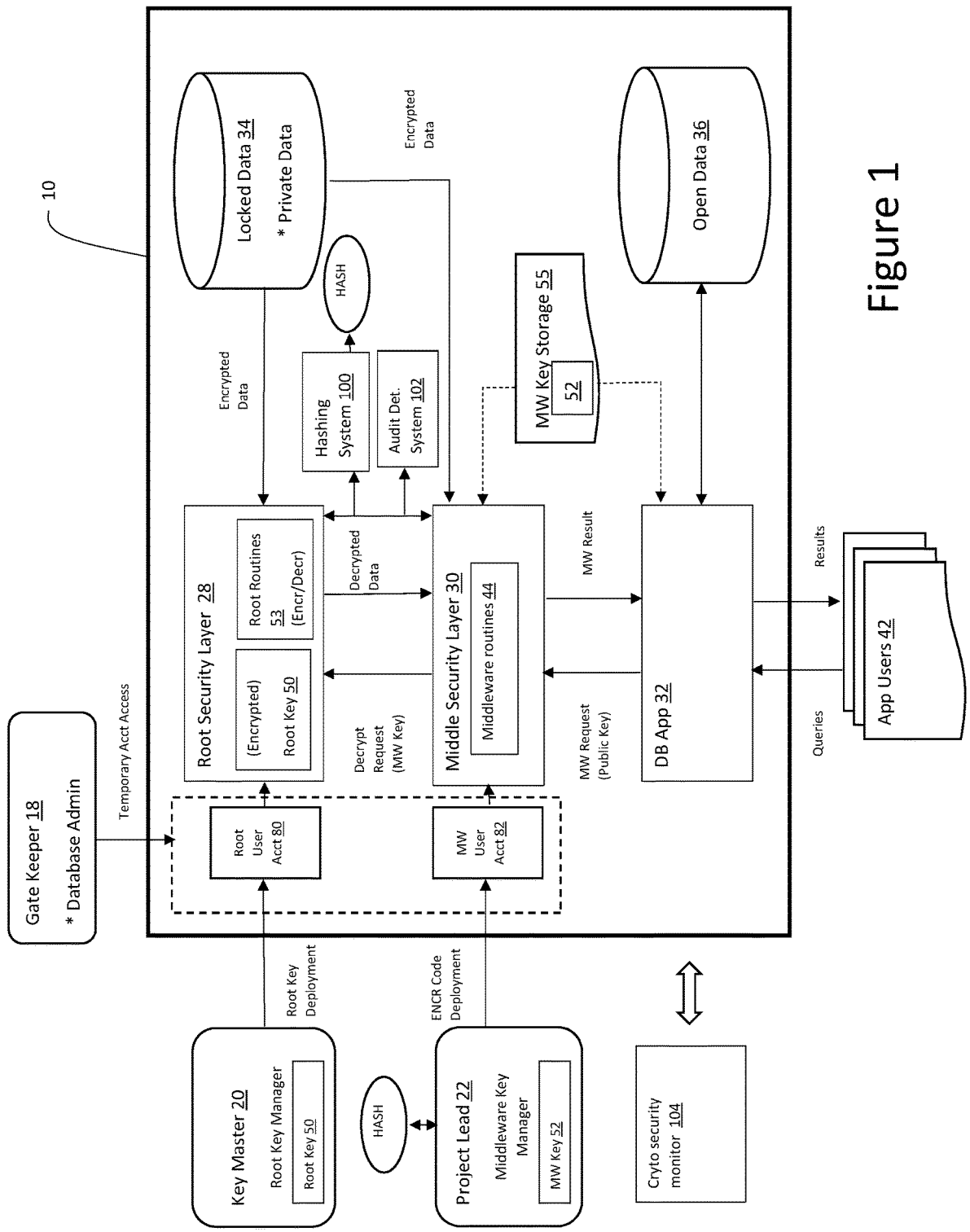
FIG. 1 shows a database security platform according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

The most secure facilities in the world are setup such that a single account, person, key, etc., does not possess the ability to compromise the system. For example, nuclear launch sites require separate keys that are administered by separate individuals in order for a launch. The largest monetized gold repository on the planet at the Federal Reserve Bank in New York City requires multiple keys to open the vault, and no single individual has access to all of the keys. The present solution provides a similar approach and represents a digital "lockbox" model for preventing a single admin account from being used to compromise protected assets. In one embodiment, multiple disparate systems are utilized to implement this digital lockbox that allows for standard business functionality and necessary maintenance without exposing protected information to exposure by a single high-level account. The lockbox can also work in conjunction with existing non-sensitive information stores as part of a larger operation.

In one embodiment, the digital lockbox can implemented with at least two separate networks, where a single admin account cannot be used to access both networks. The network that houses the private data store (i.e., lockbox) can be a disconnected database such as Oracle, so long as none of the admin accounts from any of the other networks in the system that call the lockbox can be used to access or administer the lockbox network/database. (As an example of a connected database that would not be allowed, Microsoft SQL Server allows the external network admin to reset the password on the connected database's service account, which can then access the DB at the system level and have high level access to the database, database keys, and protected data).

At least two separate keys (which may implemented as at least two key parts) are required, and each key must be housed and accessed on its own separate network. Note that the multiple keys referenced in this model are not the same as the public and private keys utilized in asymmetrical encryption and other security models. In these other systems, either of the keys can convert cypher text to plain text. In this lockbox model, all of the keys are required for any encryption or decryption action—no single key is able to unlock the data.

Three main roles in the model include: 1) a Gate Keeper, 2) a Key Master, and 3) Project Lead roles that work together to form a system of checks and balances such that no single actor has knowledge of all keys, and no single actor is able to compromise the system to obtain all of the keys or access information in an unprotected state. The Gate Keeper role is very much like a traditional 'Data Custodian' role, where this role, e.g., either is a system admin on the lockbox network (or database administrator on a disconnected database) or works in very close conjunction with one. A typical example of the Gate Keeper is a Database Administrator. The name 'Gate Keeper' is used because this role sets and manages the access rights used by the other elements of the system. They Key Master role is very similar to a traditional Information Security or 'InfoSec' role. This role is typically very familiar with policy, usually has high level oversight, and can generally set rules and procedures that must be followed. The term 'Key Master' is used because this role is responsible for the key(s) made available to a root security layer of the lockbox. The Project Lead role is very similar to the traditional Data Owner role, where this role either is a manager and/or network admin on the non-lockbox network or works in very close conjunction with one. The term 'Project Lead' is used because this role coordinates the actors that need to utilize the information stored in the lockbox, either for their own functional needs or on behalf of others (such as business or application users).

Referring now to the drawings, FIG. 1 depicts a schematic overview of a lockbox model, referred to as database security platform 10. In this illustrative embodiment, data is stored in two schemas, as "locked" data 34 that contain encrypted private data, e.g., Protected Personal Information (PPI), and as non-private application or "open" data 36 (collectively, the "database"). Locked data 34 includes private data that remains encrypted and are not readily available as plain text while open data 36 include data that is readily available. For example, open data 36 may include the job title of a set of individuals, while the locked data 36 include social security numbers (SSNs), etc.

To effectuate this process, the data security platform 10 includes two security layers on top of a database (DB) application 32, referred to herein as a middle security layer 30 and a root security layer 28. The middle security layer 30 includes middleware routines 44 designed to handle specific predefined requests from the database application 32, e.g., does this SSN match any in the database? Is this person over 21 years old? In response to receiving such a request, the middle security layer 30 sends specific decrypt requests involving private data to the root security layer 28, which includes a root set of encryption/decryption routines 53 designed to decrypt private data and return only required decrypted data results.

As detailed herein, locked data 34 can only be decrypted at the root security layer 28 with a decryption process that requires at least two keys, referred to herein as a root key 50 and a middleware (i.e., MW) key 52. The two keys 50, 52 required to access locked data 34 may be implemented in a bifurcated process (e.g., a pair of combinable key parts), or using double encryption. For example, in a bifurcated approach, the root key 50 and MW key 52 may each include a string of characters, which when combined, forms a complete decryption key. In a double encryption approach, a first key is used to encrypt/decrypt to an intermediate result, and the second key is used to encrypt/decrypt the intermediate result to a final result. The pair of keys 50, 52 are kept separate in order to ensure that no single entity has access to both keys to access the locked data 34. The root key 50 (which is itself encrypted) is stored in the root security layer 28, while the MW key 52 is passed (encrypted) into the root security layer 28 for temporary use along with a decryption request.

Accordingly, during runtime, application (App) users 42 interface only with the front-end database (DB) application 32, in which they submit queries and receive back results. For retrieving non-private information, the DB application 32 simply interfaces directly with tables in the open data 36 to obtain the necessary information. If it necessary to retrieve private data to execute an inputted query, the DB application 32 is not allowed to directly access the locked data 34. Instead, the DB application 32 must instead make a call to middle security layer 30, which includes one or more middleware routines 44 specifically implemented to handle a request type of a limited nature. For example, each middleware routine 44 is designed for particular business purpose (does this SSN match any in the data store?), as opposed to having carte blanch access to the private data. Based on the requirements specified by the middleware routine (e.g., a birthdate associated with an inputted name), the middle security layer 30 submits a specific decryption request to the root security layer 28 (e.g., decrypt and return the birthday).

Thus, as described herein, although the DB application 32 cannot directly access and return private data from the locked data 34, the DB application 32 can be implemented with functionality that allows an application user 42 to interface with private data indirectly. For example, an application user 42 may be required to enter a portion of a social security number and a date of birth into the DB application 32 to determine if there is a match among the locked data 34. In this case, the DB application 32 can return a yes/no response.

When locked data 34 is required to handle a query, the DB application 32 submits an MW request to middle security layer 30 which processes the request with a middleware routine 44 and returns a MW result. In some cases, the MW result may include a simple yes/no (e.g., a match exists) or may return actual decrypted private data (e.g., a date of birth).

Note that in most implementations, it is preferred that the MW result not include fully decrypted data (masked or tokenized data would be more acceptable), as this would present a point of potential vulnerability for an attacker who obtained the application user 42 or Project Lead 22 credentials (or even could allow a Project Lead 22 to steal the data). If decrypted private data is returned by the MW result, it is very strongly recommended that these values be routed to another external network that is not accessible by the Project Lead 22 or application user credentials and/or that very stringent monitoring and auditing is applied to the processes that would receive this information.

To handle the MW requests, middleware routines 44 can be implemented in two ways. In a first approach, the middleware routine 44 can use encryption along with a passed-in MW key 52 to encrypt an inputted data record (e.g., an SSN). The encrypted data can then be, e.g., compared to an encrypted record or records in the locked data 34 to determine if a match exists. Using this approach, no data is ever decrypted—instead processing is done by comparing encrypted data records only. In a second approach, the middleware routine 44 can submit a decrypt request, along with the MW key 52, to root security layer 28. Root security layer 28 includes a decryption routine 53 and root key 50 that can be used, along with the inputted MW key 52, to decrypt one or more locked data records. Once decrypted, the decrypted data is passed back to the middle security layer 30, which processes the decrypted data and returns a middleware (MW) result to the database application 32. The middleware routine 44, which is implemented by Project Lead 22 responsible for management of middle security layer 30, can dictate the formatted of the returned MW result, e.g., plain text sensitive data, a masked version of sensitive data that is readable to users, a token representing the sensitive data, a representation of the business process performed on sensitive data such as "yes/no match," etc. As noted, the MW key 52 is not permanently stored in the root security layer 28, but is just temporarily used by the root security layer 28 for the decrypt request.

Thus, using this multi-level security approach, once a middleware routine 44 is deployed to the middle security layer 30, a developer can easily add functionality to the front-end DB application 32 to access a defined amount/type of private data without having decryption capabilities. Accordingly, neither the application user 42 nor developer can ever compromise the private data.

While this multilayer approach ensures that the application users 42 cannot access private data during runtime, additional safeguards are incorporated to ensure that other actors, such as a Project Lead 22, database administrator, etc., also cannot readily access private data. One such safeguard involves defining three distinct roles including: a Gate Keeper 18 (e.g., database administrator) that can create user accounts and grant temporary access when required; a Key Master 20 who is responsible for maintaining the root key 50; and a Project Lead 22 who is responsible for implementing middleware routines 44.

As shown, each of the database application 32, middle security layer 30 and root security layer 28 are implemented in operationally distinct spaces or realms, such that access to files and processes in one space by a user does not allow for access to another. Each layer 28, 30 may comprise its own physical or virtual server space, requiring a unique user account. Thus, root user account 80, MW user account 82, DB app 32 developer accounts, and app user 42 accounts are only granted access to their particular layer.

As discussed, in order to decrypt data at the root security level 28, a middleware (MW) key 52 must be passed in. Security platform 10 may be implemented such that either or both the DB application 32 automatically retrieves the MW key 52 from storage and passes it to middle security layer 30 and/or a qualified and authorized resource such as the Project Lead 22 manually retrieves the MW key 52 from storage and passes it to the middle security layer 30 when access to private data is required from the DB application 32 or a qualified and authorized resource directly. Note that direct access to the MW key 52 with an account other than application users 42 (such as the MW User Acct 82) requires activation of a user account by the gate keeper 18 and authorization from a qualified third party such as the Key Master 20.

Equally important security issues also arise for higher level administrators who traditionally have system level access to all data. For example, it may be determined that the application users 42 require some additional limited private data access to perform their roles in an organization. In this case, a developer under the Project Lead 22 must write a new middleware routine 44, which may require decryption access to the private data. As discussed, the present approach contemplates at least three different administrative roles, none of which are given unfettered access to the locked data 34. These roles include a gate keeper 18, a Key Master 20 and a Project Lead 22. Accordingly, rather than provide that developer with, e.g., a key, to allow for decryption, the illustrative security platform 10 ensures that no single actor can access locked data 34.

The security platform 10 operates with the following tenets:

(1) Multiple Keys—The mechanism used to encrypt or decrypt the data requires at least two separate keys (i.e., the root key 50 and MW key 52). Note that these multiple separate keys are both required to encrypt or decrypt data. This is different than a PKI encryption system where there are two keys, but either of the keys individually can encrypt or decrypt. Any actors who have access to one of the keys must never be able to access any of the other keys to combine all of the pieces together and have the complete encrypt or decrypt key solution. For example, if the Gate Keeper 18 and Key Master 20 have access to the root key 50 then the Project Lead 22 must not be allowed to access the root key 50. Further, in this example the Gate Keeper 18 and Key Master 20 must not be allowed to access or compromise the MW key 52.

(2) Separation of Duties—Security duties are broken out into multiple roles creating a system of checks and balances. Each actor in the model has at least one other actor that can perform a check or block against that actor individually compromising protected resources. Also, an established process for requesting, authorizing, and completing system needs is utilized. For example, a database administrator cannot complete a request from a developer to have a secure account activated (or any request that was not approved by an established role within the organization). In order for any action to be taken, that action must be authorized by at least one and possibly two other qualified roles.

(3) Encryption—The private data is encrypted using a robust algorithm so that the protected resources on their own cannot be read directly—a separate key is needed to unlock the data.

The primary accounts and associated roles are as follows:

(1) Gate Keeper 18, which is responsible for user access to the root security layer 28 and middle security layer 30. The Gate Keeper 18 controls user account creation, privileges, and access to objects contained therein. The Gate Keeper 18 may play a role in managing the root key, but does not have access to MW key 52.

(2) Key Master 20, which is either fully or partially responsible for the root key 50, and storing the root key 50 in the root security layer 28. The Key Master 20 also performs a very import audit function and can act as a qualified authorizer of requests whose approval is required for any action to proceed within the model. The Key Master 20 does not have access to the MW key 52.

(3) Project Lead 22, which is responsible for the MW key 52. The Project Lead 22 can request actions to be performed by the Gate Keeper 18 (e.g., allow access to the middle security layer 30) but these requests may require the authorization of at least one other qualified role such as the Key Master 20. The Project Lead 22 does not have access to the root key 50.

(4) Developer(s), which are responsible for application development and maintenance. The developer does not have access to either key, and cannot access live files or servers. Instead, the developer must provide updates and changes to the Project Lead 22. Note that this role is optional and these duties may be performed directly by the Project Lead 22. Note also that the developer role may include one or many resources of varying levels (e.g., Senior Developer, Technical Lead, etc.).

(5) Security Oversight, which is responsible for reviewing application code for back doors and other intentional breach attempts within the DB application 32. Note that this role is optional but recommended in cases where, e.g., sensitive data must be rendered in plain text in the DB application 32. Security Oversight can be performed and administered by the Key Master 20 role.

Accordingly, as shown in the illustrative embodiment of FIG. 1, the Key Master 20 is the only person authorized to temporarily administer the root security layer 28 via a root user account when allowed by the Gate Keeper 18 (and optionally approved by the Project Lead 22). Similarly, the Project Lead 22 is the only person authorized to temporarily administer the middle security layer 30 via an MW user account 82 when allowed by the Gate Keeper 18 (and optionally approved by the Key Master 20). As such, access to the root security layer 28 and middle security layer 30 is highly regulated, and ideally requires at least two people aware of the access. This helps to ensure that no individual can for example install code on either system to capture the MW key 52 or root key 50.

Even with all the aforementioned safeguards, it is still possible for one of the administrative roles to obtain unauthorized access to the locked data 34. For instance, the Project Lead 22 could slip malicious code into a middleware routine 44 to obtain back-door access to unlocked data. Accordingly, a further set of precautionary safeguards must be implemented to ensure no unauthorized code insertions occurred. These safeguards include: (1) a hashing system 100 that can hash the routines 44, 53 in the middleware security layer 30 and root security layer 28, as well as the hashing system 100 itself; and (2) an auditing detection system 102 that allows for detection of potential malicious auditing of the middleware security layer 30 and root security layer 28. For example, malicious auditing could be employed by a bad actor in the platform 10 to attempt to capture keys, key parts, or unprotected data passed as parameters to calls to the security routines therein. (Note that auditing of changes to the system such as a dated log of which user account was used to modify routines, user access, etc., is a separate and very much recommended type of auditing. Therefore, the audit detection system 102 primarily detects auditing that would be used in a potentially malicious manner). Implementation of the each of these security safeguards are described in further detail with further reference to FIGS. 2-4.

Figure 2:
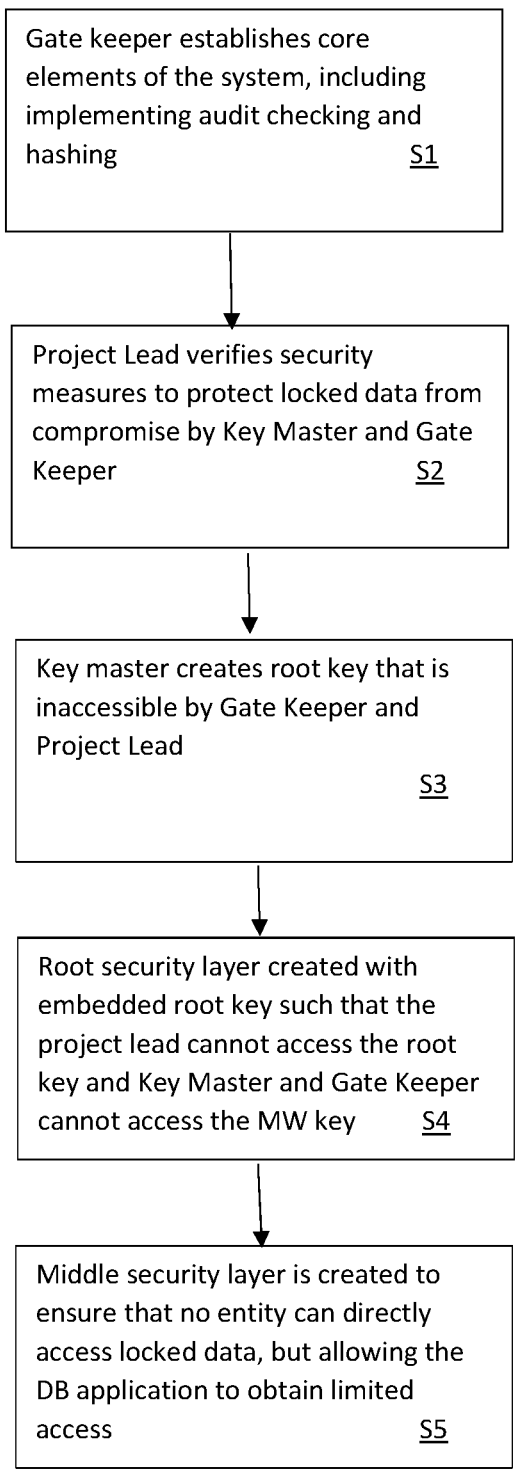
FIG. 2 shows a flow diagram of a set up process for the security platform according to embodiments.

FIG. 2 depicts a process for establishing the data security platform 10. At S1, the Gate Keeper 18 establishes core elements of the system 10, including implementing audit detection and hashing. The Gate Keeper 18 may perform the following tasks:

1. Gate Keeper 18 creates user accounts for the database application 32.

2. Gate Keeper 18 creates database objects including locked data 34 and open data 36.

3. Gate Keeper 18 creates (or provides access to) an audit detection system 102 having an audit detection routine to allow for checking an audit state in both the middle security layer 30 and root security layer 28. Project Lead 22 and Key Master 20 would work with Gate Keeper 18 to ensure that provided system contains no exploits or vulnerabilities.

4. The Gate Keeper 18 provides an audit detection account that allows Project Lead 22 to read the contents of an audit detection routine.

5. Gate Keeper 18 creates (or provides access) to a hashing system 100 having a hash routine to allow for creating hashes of existing code routines (including the hash routine itself) to confirm no unauthorized code alterations occurred in the middle and root security layers. Project Lead 22 and Key Master 20 would work with Gate Keeper 18 to ensure that provided system contains no exploits or vulnerabilities.

6. The Gate Keeper 18 provides a hash checking account that allows Project Lead to execute the hash routine.

Next, at S2, the Project Lead 22 verifies security measures to protect locked data from compromise by Key Master 20 and Gate Keeper 18. These steps may include:

1. Project Lead 22 utilizes known expected values to certify both the audit check routine and hash routine.

2. Project Lead 22 uses the account provided by the Gate Keeper to create a hash of the audit check routine.

3. Project Lead 22 uses the account provided by the Gate Keeper to create a hash of the hash routine.

4. Project Lead 22 generates the MW Key 52 (e.g., a set of random bytes). As noted, during runtime, the MW Key 52 will be combined with the Root Key 50 to perform cryptography routines in root security layer 28. In the case of a bifurcated key approach, the size of the combined key ultimately used for encryption and decryption (for example 32 characters) will need to be used to determine which portion of the full key will be allocated for the MW key 52 and root key 50 (for example, 16 characters for each).

5. Project Lead 22 creates a hash of the MW key 52. Optionally, the Project Lead 22 additionally creates or obtains a Public/Private Key pair to be used at runtime to establish a shared symmetric key for encrypting communications between the DB App 32 and root security layer 28.

6. Project Lead 22 stores the MW key 52 in a secure location (e.g., MW key storage 55) that is accessible by the DB App 32 (e.g., in a Hardware Security Module "HSM" that returns an encrypted value that is taken in by the DB App 32 during runtime) but inaccessible by the Gate Keeper 18 and Key Master 20 and Developers. Alternatively, the Project Lead 22 stores the MW key 52 outside of an HSM where it is also inaccessible by the Gate Keeper 18 and Key Master 20.

7. If an HSM is used, then Project Lead 22 sets DB App 32 to pass the accessible encrypted MW key 52 to the HSM to get back to get back original MW key 52 at runtime. An alternative option is to encrypt the MW key 52 using another mechanism for storing in a DB App 32 accessible location and the decrypt when loaded into the DB App 32 during runtime. If the MW key 52 is not going to be encrypted, then it will reside in the DB App accessible location in its original state. Note that the MW key 52 must be stored in a network environment that is controlled by a completely different master account than the environment that houses the root key 50.

Next, at S3, Key Master 20 establishes a root key 50 that is inaccessible by Gate Keeper 18 and Project Lead 22. This may include the following steps:

1. The Project Lead 22 provides the hash of the hash routine to the Key Master 20.

2. The Project Lead 22 provides the hash of the audit routine to the Key Master 20.

3. Key Master 20 creates root key 50 (ideally random bytes) and stores it in a secure location that is inaccessible by the Project Lead 22 or Gate Keeper 18. (Note that at runtime, the root key 50 will be combined with the MW key 52 to perform cryptographic routines 53 in the root security layer 28, so if a bifurcated key will be used the size of the combined key ultimately used for encryption and decryption (for example 32 chars) will need to be used to determine which portion of the full key will be allocated for the MW and root key (for example 16 chars for each)). Note also that the root key 50 must be stored in a network environment that is controlled by a completely different master account than the environment that houses the MW key 52. If the root key 50 is to be embedded into a Data Store system, then that Data Store system must be able to run in disconnected mode (such as Oracle).

4. The Project Lead 22 creates an encrypt script that will allow the Key Master to encrypt the root key 50. The encrypt script will take two parameters: 1) the hashed value of the MW key 52, and 2) the plain text value of the root key 50.

5. The Project Lead 22 provides separate identical copies of the script to the Gate Keeper 18 and the Key Master 20.

6. If approved by Gate Keeper 18, Gate Keeper 18 passes their version of the encrypt script to Key Master 20.

7. The Gate Keeper 18 provides a code checking account that allows Key Master to execute the hash routine.

8. The Key Master 20 uses the code checking account provided by the Gate Keeper to create a hash of the hash routine.

9. The Key Master 20 compares the returned value from step 8 to the hash value previously provided by the Project Lead 22. If they do not match, the setup is halted.

10. Key Master 20 creates a hash of both scripts from steps 5 and 6 and makes sure the hashes match to ensure no tampering. If the hashes do not match, then setup is halted.

11. Project Lead 22 creates a hash of the plain text MW key 52 and provides it to the Key Master 20. (Note that the Gate Keeper 18 cannot be allowed to see the hash of the plain text MW key 52). Optionally, a separate Public/Private Key pair is created and the Public Key is provided to be embedded into the root security layer 28 to be used for PKI at runtime.

12. The Gate Keeper 18 provides an audit detection account that allows Key Master 20 to read the contents of the audit detection routine.

13. The Key Master 20 uses the audit detection account provided by the Gate Keeper 18 to create a hash of the audit detection routine.

14. The Key Master 20 compares the returned value from step 13 to the hash value previously provided by the Project Lead 22. If they do not match, the setup is halted.

15. Key Master 20 uses the hash of the plain text MW key 52 provided by the Project Lead 22 and passes it as a parameter to the encrypt script along with the plain text value of the root key 50 to generate an encrypted value for the root key 50. (Note that the Gate Keeper 18 and the Project Lead 22 cannot be allowed to see the plain text value of the root key 50. Also, the Project Lead 22 cannot be allowed to see the encrypted value of the root key 50. The encrypt script will contain a check that calls the audit detection routine and will cancel out with an error if auditing is detected prior to executing the routines where the keys are passed as parameters.)

Next, at S4, the root security layer 28 is created with the embedded root key 50 such that the Project Lead 22 cannot access the root key 50 and Key Master 20 and Gate Keeper 18 cannot access the MW key 52. This may include the following steps:

1. The Project Lead 22 provides the hash of the hash routine to the Key Master 20.

2. The Gate Keeper 18 provides a code checking account that allows Key Master 20 to execute the hash routine.

3. The Key Master 20 uses the code checking account provided by the Gate Keeper to create a hash of the hash routine.

4. The Key Master 20 compares the returned value from step 3 to the hash value previously provided by the Project Lead 22. If they do not match, the setup is halted.

5. The Project Lead 22 creates a root script that will create the root security layer routines 53 and embed the encrypted root key 50. These routines 53 will include the cryptography routines for locking and unlocking data where the root key 50 is combined with the MW key 52 and also the routines to create a secure encrypted and authenticated session between the DB App 32 and root security layer 28. The root script will either have a placeholder or take a parameter to allow for the insertion of encrypted value of the root key 50. (Note that the Project Lead 22 cannot know what the encrypted value of the root key 50 is). Optionally, a separate Public Key to be embedded into the root security layer to be used for PKI at runtime is provided as well and included in the root script.

6. The Project Lead 22 provides separate identical copies of the root script to the Gate Keeper 18 and the Key Master 20.

7. If approved by Gate Keeper 18, Gate Keeper 18 passes their version of root script to Key Master 20

8. Key Master 20 creates a hash of both scripts from steps 6 and 7 and makes sure the hashes match to ensure no tampering. If the hashes do not match, then setup is halted.

9. The Gate Keeper 18 provides credentials to the Key Master 20 that allows the Key Master to execute the root script and create a hash of the resulting root security layer 29 with embedded root key 50.

10. The Key Master 20 executes the root script providing the encrypted value of the root key 50 and captures a hash value of the output. This hash value is kept for verification and provided to the Project Lead 22 and optionally a Crypto Sentry monitor 104.

11. Gate Keeper 18 revokes Key Master script create privileges.

12. The root script with the encrypted value of the root key is provided to the Gate Keeper 18 who then executes the root script to create the actual root security layer 28 with the embedded value of the encrypted root 50.

13. The Key Master 20 uses the account provided by the Gate Keeper 18 to create a hash of the newly created root security layer 28.

14. The Key Master 20 compares the returned value from step 13 to the previous hash value generated in step 7. If they do not match, the setup is halted 15. The Key Master 20 takes a hash of the root security layer 28 and provides to it Project Lead 22 and optionally Crypto Sentry monitor 104.

16. Project Lead 22 verifies the root security layer is properly established.

Next, at S5, middle security layer 30 is created to ensure that no entity can directly access locked data from this layer, but allows the DB application 32 to obtain limited access using a middleware routine 44. The following steps may be used to accomplish this:

1. The Project Lead 22 provides the hash of the hash routine to the Key Master.

2. The Gate Keeper 18 provides a code checking account that allows Key Master to execute the hash routine.

3. The Key Master 20 uses the account provided by the Gate Keeper to create a hash of the hash routine.

4. The Key Master 20 compares the returned value from step 3 to the previous hash value provided by the Project Lead. If they do not match, the setup is halted.

5. Developer (or Project Lead) provides encrypt script for creating the middle security layer 30 to Project Lead 22.

6. Project Lead 22 reviews the encrypt script to make sure there are no vulnerabilities in the code that would expose sensitive locked data 34.

7. The Project Lead 22 provides separate identical copies of the encrypt script to the Gate Keeper and the Key Master.

8. If approved by Gate Keeper, Gate Keeper passes their version of the encrypt script to Key Master 20.

9. Key Master 20 creates a hash of both scripts from steps 7 and 8 and makes sure the hashes match to ensure no tampering. If the hashes do not match, then setup is halted.

10. The Gate Keeper 18 provides credentials to the Key Master 20 that allows the Key Master to execute the encrypt script and create a hash of the resulting middle security layer 30.

11. The Key Master 20 executes the encrypt script to capture a hash value of the output. This hash value is kept for verification and optionally provided to the Crypto Sentry monitor 104.

12. Gate Keeper 18 revokes Key Master script create privileges.

13. Project Lead 22 requests a create session for MW User acct 82 and credentials from Gate Keeper 18.

14. Project Lead 22 logs on as an MW user to execute the encrypt script for creating the middle security layer 30 to call root routines 53. At the same time, any required seed values are inserted into Locked Data 34. The generation of the middle security layer 30 routines returns a hash value that is stored by the Project Lead 22 and is provided to the Key Master and Crypto Sentry. If the hash value provided to the Key Master by the Project Lead does not match the previous hash value from step 11, Key Master halts the setup.

15. Project Lead 22 notifies the Gate Keeper to end the session for the MW user.

16. The Key Master 20 uses the account provided by the Gate Keeper 18 to create a hash of the newly created middle security layer 30. If the returned hash value does not match with the previous hash value from step 11, then the setup is halted 17. Middleware routines 44 are deployed with calling access provided to DB App 32 and App Users 42 (as needed), which will need to pass the MW key.

18. Seed values are inserted into Open Data 36 Database Tables as needed.

Figure 3:
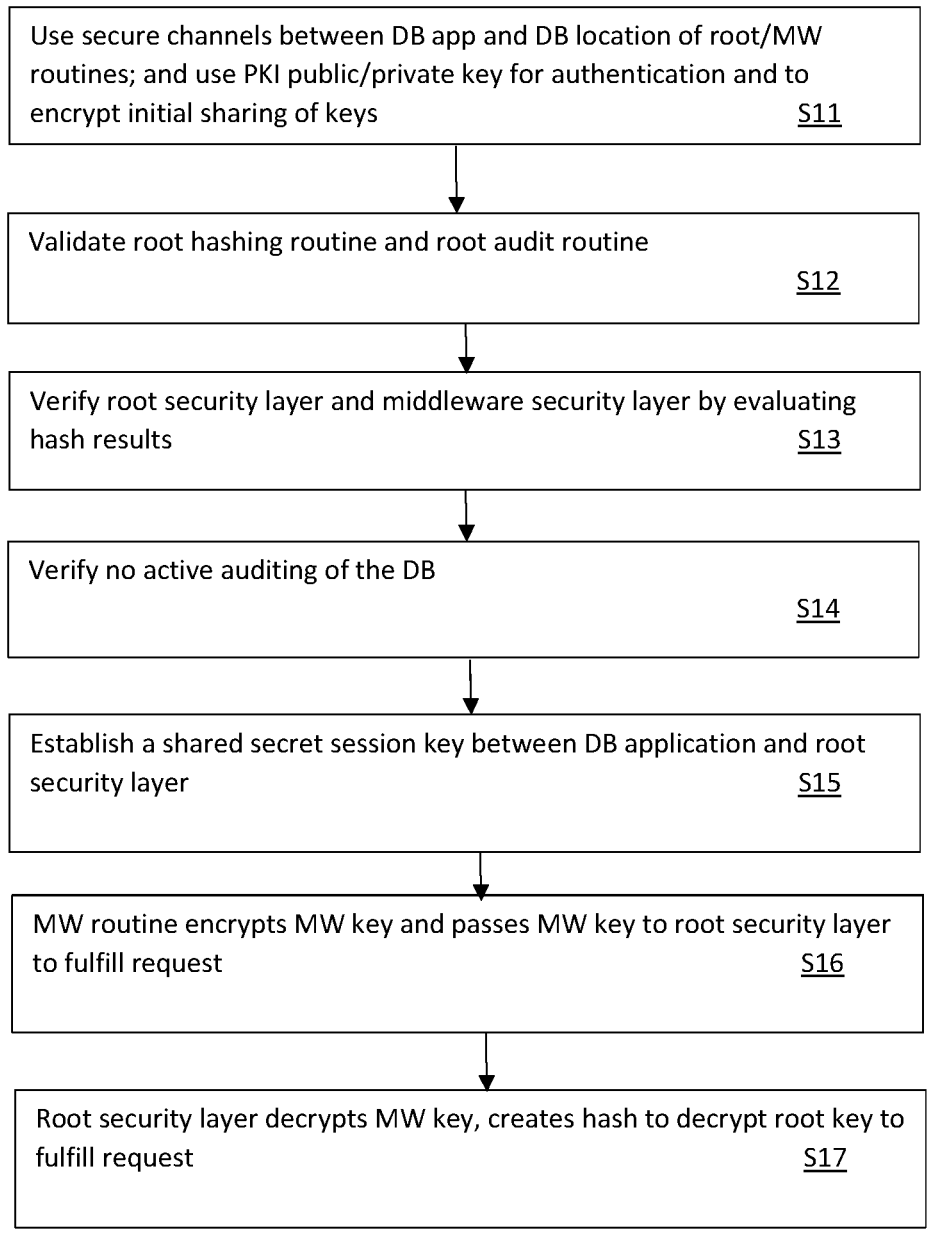
FIG. 3 shows a flow diagram of a runtime process for the security platform according to embodiments.

FIG. 3 depicts an overview of the runtime process when the DB App 32 needs to access locked data 34. At S11, various security protocols are put into place. Namely, it is very strongly recommended that communications between the DB App 32 and the database where the middle security layer 30 and root security layer 32 code resides be conducted on a secure encrypted tunnel. Additionally, a PKI public/private key is recommended to establish a secure handshake to authenticate both the DB App 32 and database side and encrypt the initial sharing of the keys used for secure communications. This is both to deter any Man-in-the-Middle attacks as well as make it as difficult as possible for the Gate Keeper 18 to be used for compromise attempts to obtain the MW key 52.

At S12, the previously stored hash of the hash routine is compared to a runtime generated hash of the hash routine to certify its validity; and the previously stored hash of the audit detection routine is compared to a runtime generated hash of the audit detection routine to certify its validity.

At S13, the stored hash of the root security layer 28 is used to compare against the results returned from the call to the hash routine to verify code has not been altered; and the stored hash of the middle security layer 30 is used to compare against the results returned from the call to the hash routine to verify code has not been altered.

At S14, a call to the audit detection routine verifies that no active auditing of the DB has occurred. A noted, auditing in this step does not refer to auditing to determine what changes were made and by whom. Auditing here refers to the ability of the Gate Keeper to turn on tracking of all system calls. In this case, the Gate Keeper could use this audit tracking to see parameter values passed to the root security layer 28 in order to obtain the hashed value of the MW Key. With this value, the Gate Keeper would then be able to provide self-access to the root security layer and call the routines to decrypt the data, thereby compromising the protections. Therefore, the Project Lead 22 must ensure that prior to making any calls that pass the MW Key as a parameter within the domain that the Gate Keeper controls, a check is first made to ensure that auditing that would track and potentially log parameters is deactivated or turned off. This includes any calls made to or by the middle security layer 30. This also includes calls to the root security layer 28. The check to confirm the audit state and hash routine state within get Gate Keeper domain should be made from outside the domain or network controlled by the Gate Keeper. This prevents the Gate Keeper from turning off these controls and then compromising these system checks undetected. Similarly, the DB app that makes calls to the middle security layer must also make the same check before passing the MW key to the middle security layer.

At S15, DB App 32 establishes a shared secret session key with the root security layer 28. Ideally, this is done using PKI and a previously embedded Public Key established during the setup process described in FIG. 2. Alternatively, an algorithm such as the Diffie-Hellman protocol can be used. Whether or not PKI is used, a secure tunnel is very strongly recommended.

Once the shared secret session key is established between DB App and root security layer 28, the calling routine encrypts the MW key 52 at S16 using the shared symmetric session key and passes to the root security layer 28. The root security layer 28 decrypts the passed in MW key 52 into memory at S17, then creates a hash of the decrypted MW key 52 and uses it to decrypt the stored root key 50 and, in a bifurcated key approach, combines it with the decrypted MW key 52 to hold the full encryption key in memory. Otherwise, both keys are stored separately in memory. Once the full key or separate keys are established in memory, the encrypted Public Key continues to be passed to calls to root security layer 28 to compare against the stored hash to verify authenticity. Optionally, an additional Nonce value can be passed between DB App 32 and root security layer 28 that changes regularly to deter replay attacks. If the root security layer 28 is able to use the passed in MW key 52 to decrypt the stored root key 50, this establishes that the MW key 52 is valid and further communications are allowed. Otherwise, an error is returned and the root security layer 28 cannot be utilized.

If the root security layer 28 accepts the passed in MW key 52, the root security layer 28 cannot be directly accessed by the DB App 32 based on the functionality established in the middle security system 30. The audit detection and code integrity checks can be made on each call, only when the MW key 52 is initialized and confirmed, or at intervals in-between. The decision can be based on the trade-off between efficiency and security. Since changes to auditing and compiled code typically trigger a new session, which would initiate a re-check of these DB elements, calls to check for auditing and code authenticity on session creation are usually sufficient.

With the shared secret session key, sensitive values can be passed and, if necessary, returned encrypted so that they are not vulnerable in transit. The MW key 52 needs to always be passed encrypted. The root key 50 is never placed in transit.

An optional Crypto Sentry monitor 104 runs and compares stored hash values for the root security layer 28 and middle security layer 30 against runtime generated hash values for these routines to verify they have not been altered.

Figure 4:
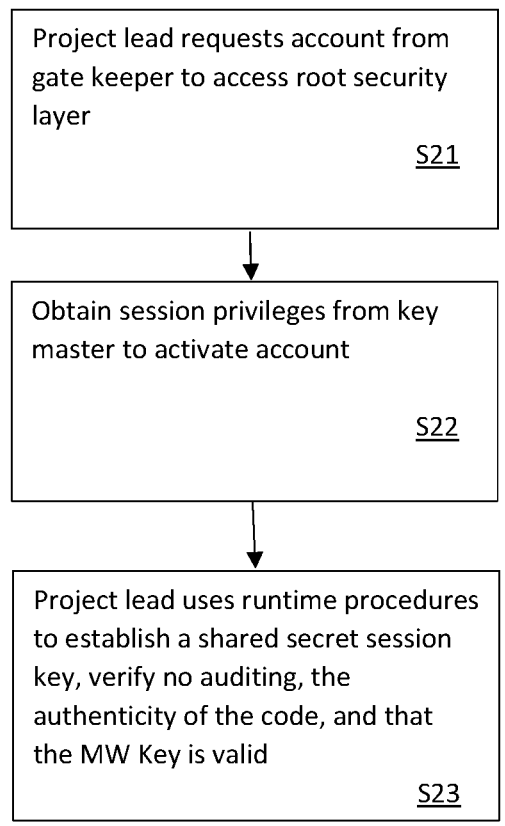
FIG. 4 shows a flow diagram of a maintenance process for the security platform according to embodiments.

FIG. 4 depicts a process for performing maintenance on the database security platform 10. A2 S21, the Project Lead 22 can request an account from the Gate Keeper (such as ROOT_PL$_{13}$ USER) that provides direct access to the root security layer 28 (rather than going through the middle security layer 30). This account is disabled by default, and only gets SESSION privileges at S22 upon a request approved by a 3rd party such as the Key Master 20. When the ROOT_PL_USER account is activated, additional security controls are recommended to monitor activities with this account. Note that the Gate Keeper and Key Master would not be able utilize the ROOT_PL_USER account when activated, because they do not have the MW key 52 required to decrypt the stored Root Routines 53.

Once the Gate Keeper provides credentials to a Project Lead 22 for the activated ROOT_PL_USER account, the Project Lead at S23 utilizes the same steps as used during runtime process in FIG. 3 to establish a shared secret session key, verify no auditing, the authenticity of the code, and that the MW key 52 is valid. It is strongly recommended that the Project Lead 22 use an encrypted tunnel when calling the Root Security Layer 28 and also incorporate PKI in the initialization process of the script.

Additional features that can optionally be incorporated to enhance security include the following. Items passed in plain text on the wire are vulnerable to breach. Hardware and network protections can be used to mitigate this risk. For example, the unencrypted plain text values returned from a call to decrypt sensitive data for use in the front-end application are susceptible to being compromised by network sniffers. Securing the network can help mitigate these risks The process of encrypting and/or decrypting data occurs in the random or volatile memory within the data store application. While in-process, there is a potential vulnerability for a malicious agent to scrape the RAM in order to compromise the key. Utilizing data store applications that incorporate Software in Silicon (SiS) hardware that prevents external reads (scrapes) will mitigate this risk. Likewise, the operating systems that process the public key and pass the value to the data store application can employ the same protections.

Any time the public key is passed on the wire (network), the connection would ideally be encrypted (i.e. SSL or VPN). This will ensure the key is encrypted in transit and prevent breach via packet sniffing.

Keys (Public and Private) will ideally be stored outside of the application. Care will need to be taken that these keys are not stored in such a way that it would be easy for a malicious actor to compromise the backup where the keys are stored. Strong Encryption tools such as Advanced Encryption Standard with a 256 bit key (AES256) or higher are recommended. A strong source code repository is recommended for storing the code that will house the public key.

Most data store applications possess filter policy roles that only allow connectivity from specific IP addresses. This functionality can be utilized to prevent compromised credentials from being used to connect to the database from unauthorized entry points. The application connection information will ideally be stored in a secured manner such as encrypting the connection string if stored in a configuration file.

Vulnerabilities may lie within the integrity of the overall architecture (outside the security platform 10). For example, unhandled exceptions within an application can be sources of vulnerability. These can be mitigated by Runtime Application Self Protection (RASP) components, strong Firewalls, good software patching practices, network monitoring, etc.

Since most data store applications provide a mechanism to detect the user id, IP address, server name, etc., from the calling entity, additional security can be achieved by adding platform specific code to routines that check for these properties and raise an exception if the server Meta Data is incorrect.

Some data store applications provide utilities for separating the duties of accounts within the data store. These utilities can help make it more difficult for the Gate Keeper and other SYS level users in the data store to compromise the data and/or the keys.

The keys would ideally be changed every 12 months or less. One means to accomplish this is to write a code routine in the root security layer 28 that takes both the new and the prior root key and makes a call to a root routine 53 to decrypt using prior key passing the prior MW key and then taking the result and calling the root routine 53 to encrypt the data passing the new key. The newly encrypted values would overwrite the pre-existing values.

For applications that need to display plain text sensitive information from the database, system level application user accounts would be able to log in to the application and view data. Consequently, it is most secure if these accounts are disabled and can only be enabled by a Project Lead request approved by an authorized 3$^{rd}$ party such as the Key Master.

Sensitive data can be tokenized to add an additional layer of anonymity. For example, random IDs can be created for each client record, and the random id can then be utilized by the application to represent an applicant, using that ID to process sensitive data only when needed. Since the ID on its own could not be used to identify a given person, it is much safer than using personal information as the record identifier.

An alternative approach may be implemented as follows, again with reference to FIG. 1.

The Gate Keeper 18 creates the MW User, APP User and ROOT_PL_USER accounts. Note that it is recommended that accounts be created under the 'Least Privilege' doctrine. In other words, the accounts will be given the least amount of privilege necessary to perform the needs of the account. Additional privileges can be added later if needed if authorized, but it is better to have the account ask for additional privileges rather than automatically have them.

Figure 5:
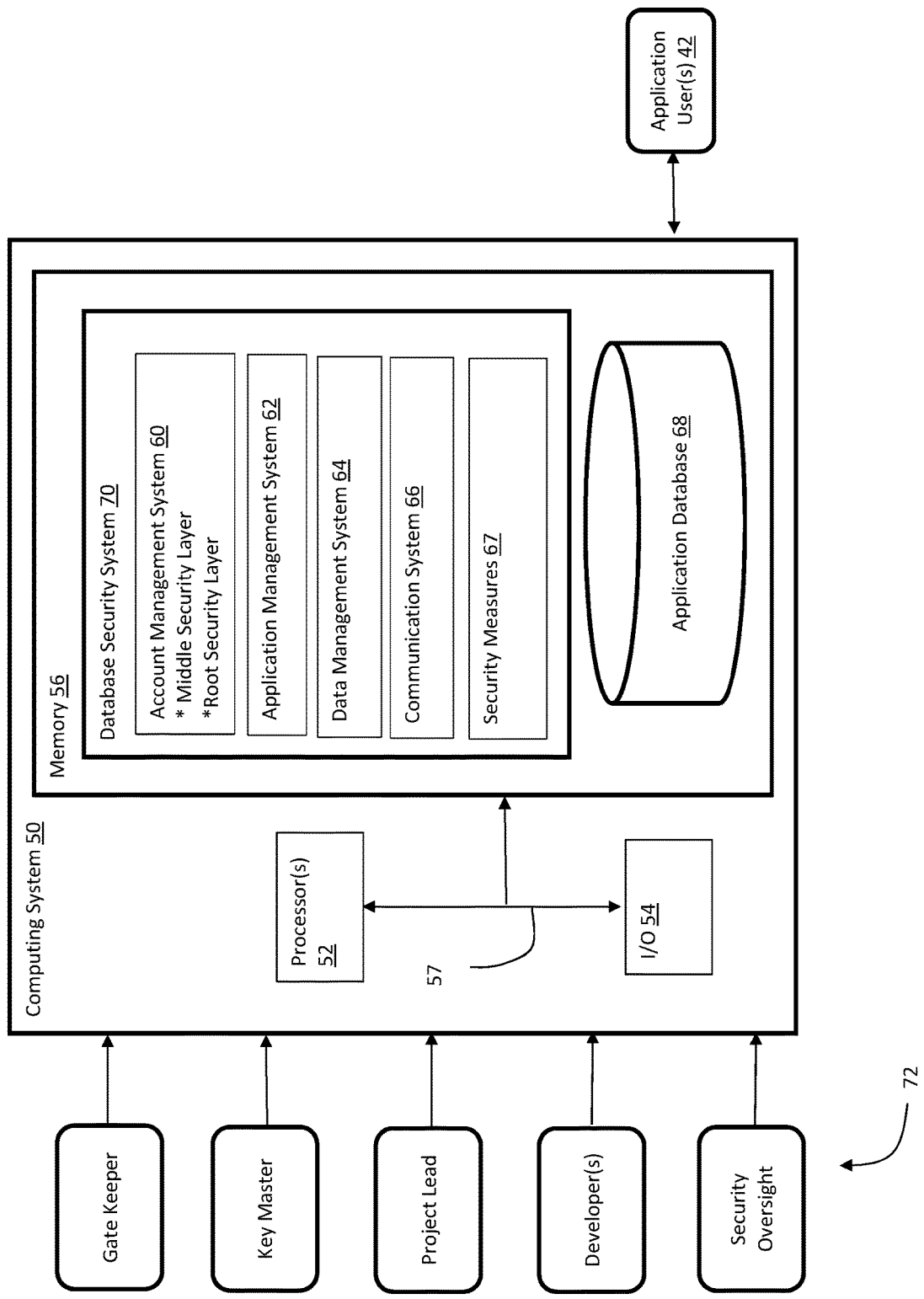
FIG. 5 shows a computing system for implementing a database security platform.

FIG. 5 depicts an illustrative computing system 50 for implementing a database security system 70 to implement to above described database security platform 10 for an application database 68. Database security system 70 generally includes an account management system 60 for establishing the root security layer 28 and Middle security layer 30. As noted, the Gate Keeper role is largely responsible for creating accounts and establishing privileges. As such the account management system 60 would allocate the necessary resources for the Gate Keeper. Application management system 62 is responsible for establishing and managing the DB application 32. Associated permissions, firewalls, etc., may be handled by the application management system 62. Data management system 64 is responsible for setting up database tables and determining which data belongs in locked data 34 and which belongs in app data 36. Communication system 66 provides a platform through which the different roles can communicate with each other. For example, if a developer wanted to deploy a new encrypted code function 44 (FIG. 1), the developer could pass the code or an associated request to the Project Lead via the communication system 66. Security measures 67 include, e.g., hashing system 100 and auditing detection system 102.

Rather than combining the MW and Root keys together to create a single master key for encryption, one can opt to double encrypt each value instead with both the Program and Root keys separately. In this scenario, both the MW and Root keys can be the full length of a normal encryption key. Note most DB Systems provide Transparent Data Encryption (TDE) when storing data values to a file. So stored encrypted values are typically double encrypted already.

The Root security layer and/or the Middle security layer can be housed inside a Hardware Security Module (HSM) rather than a data store application. In this scenario, the Root key along with the scripts to execute the code are embedded into the HSM. The HSM will ideally operate under a separate network than the one in which the MW key is housed.

The Root key can be stored inside an HSM rather than a data store application. In this scenario, the Root key is retrieved by the Root security layer. The HSM will ideally operate under a separate network than the one in which the MW key is housed.

It should be noted that any number of alternatives or modifications to the lockbox model described herein may be employed within the scope and spirit of the invention. For example, one possible alternatives to the model is to not use the Key Master role. This model would still be effective since a premise of the model is having two separate networks (i.e., the lockbox network and a network for storing the MW key). Given that the Project Lead "controls" the middle security layer and the Gate Keeper "controls" the root security layer, the two could manage the separation without the Key Master. For example, the Project Lead could perform the check on any code put in by the Gate Keeper by checking its hash value before and after. Likewise, the Gate Keeper could perform the check on any code put in by the Project Lead by checking its hash value before and after.

The main drawback without the Key Master is that the Root Key would be known to the Gate Keeper (i.e., the Gate Keeper would need to take over for Key Master in creating and storing the Root Key). However, the Project Lead would be able to keep the MW Key away from the Gate Keeper and still be able to run the Audit and Hash checks to keep the MW Key away from the Gate Keeper at run time. Likewise, the Project Lead would still not be able to access the Root Key. The other drawback is that there is no designated third party to serve as a check on requests by the Project Lead to activate the account to directly call the Root Security layer routines. The Project Lead would still be dependent on the Gate Keeper activating the account and confirming the request though, so this satisfies the model in that no single actor can compromise the data. In this alternative there is less security, but it still meets the requirements of the lockbox.

Since the Project Lead would need to be able to pull and read the root security routines to create the hash signature for verification at runtime, the Gate Keeper would not be able to store the Root Key in the Route Security layer (because the Project Lead would be able to see it). Therefore, the Gate Keeper would need to store the Root Key in a separate layer that could be called at runtime by the root security layer to pull in the Root Key, but in a way where the Project Lead could not access it (such as under an account with no session privileges that only allows read by the root security layer account—which also does not allow session privileges). The root security layer could then include the call to this separate Root Key space as a variable or parameter that would be consistent to allow for hashed signature validation without exposing the actual key value. The Gate Keeper would need to verify that there are no exploits in the root security routines that would attempt to compromise the Root Key at runtime.

In this alternative embodiment, one can choose to either use or not use the Key Master role. If used, the Key Master would serve as oversight to add an additional check for change and/or access requests as well as possible auditing.

It is understood that database security system 70 may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computing system 50 that may comprise any type of computing device and for example includes at least one processor 52, memory 56, an input/output (I/O) 54 (e.g., one or more I/O interfaces and/or devices), and a communications pathway 57. In general, processor(s) 52 execute program code which is at least partially fixed in memory 56. While executing program code, processor(s) 52 can process data, which can result in reading and/or writing transformed data from/to memory and/or I/O 54 for further processing. The pathway 57 provides a communications link between each of the components in computing system 50. I/O 54 can comprise one or more human I/O devices, which enable a user to interact with computing system 50. Computing system 50 may also be implemented in a distributed manner such that different components reside in different physical locations.

Furthermore, it is understood that the data security system 70 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A database security platform for providing secure access to private data in an encrypted storage area, comprising:
    a hardware processor and a memory configured to implement:
        a database application configured to receive queries from application users requiring access to encrypted private data, in which the encrypted private data is not directly accessible by the database application;
        a middle security layer having a plurality of middleware routines that are callable from the database application to facilitate predefined access to the encrypted private data and return a result to the database application, and wherein the encrypted private data is not directly accessible by the middle security layer and the middle security layer is not directly accessible by application users;
        a root security layer configured to receive a decryption request from the middle security layer, perform decryption on specified encrypted private data, and return decrypted data to the middle security layer, wherein the decryption requires both a root key stored in root security layer and a middleware key provided by the middle security layer with the decryption request;
        a hashing system that generates a hash of routines implemented by the middle security layer and root security layer and compares the hash to a previously generated hash to ensure integrity of the middle security layer and root security layer; and
        an auditing detection system that detects malicious auditing by monitoring for parameters being passed between the middle security layer and root security layer.

2. The database security platform of claim 1, wherein a Gate Keeper grants user access rights to the root security layer only via a root user account and grants user access rights to middle security layer only via a middleware user account.

3. The database security platform of claim 2, wherein the middleware user account is associated with a Project Lead responsible for establishing the middleware key and the root user account is associated with a Key Master responsible for establishing the root key.

4. The database security platform of claim 3, wherein the root security layer encrypts and stores the root key, and wherein the root security layer is prohibited from permanently storing the middleware key.

5. The database security platform of claim 1, wherein the result returned to the database application from the middle security layer includes one of: decrypted private data, a yes/no match, masked data or tokenized data.

6. The data security platform of claim 1, further comprising a crypto sentry that verifies all routines involved in passing the middleware key.

7. The database security platform of claim 1, wherein the hashing system includes a hash routine and wherein the hashing system hashes the hash routine to further ensure integrity.

8. The database security platform of claim 1, wherein the middle security layer encrypts the middleware key when the middleware key is passed to the root security layer.

9. A computer program product stored on a non-transitory computer readable storage medium, which when executed by a computing system, provides a database security platform for providing secure access to private data in an encrypted storage area, comprising:
    program code for implementing a database application configured to receive queries from application users requiring access to encrypted private data, in which the encrypted private data is not directly accessible by the database application;
    program code for implementing a middle security layer having a plurality of middleware routines that are callable from the database application to facilitate predefined access to the encrypted private data and return a result to the database application, and wherein the encrypted private data is not directly accessible by the middle security layer and the middle security layer is not directly accessible by application users;

program code for implementing a root security layer configured to receive a decryption request from the middle security layer, perform decryption on specified encrypted private data, and return decrypted data to the middleware layer, wherein the decryption requires both a root key stored in root security layer and a middleware key provided by the middle security layer with the decryption request;

program code that generates a hash of routines implemented by the middle security layer and root security layer and compares the hash to a previously generated hash to ensure integrity of the middle security layer and root security layer; and program code that detects malicious auditing by monitoring for parameters being passed between the middle security layer and root security layer.

10. The computer program product of claim 9, wherein a Gate Keeper grants user access rights to the root security layer only via a root user account and grants user access rights to the middle security layer only via a middleware user account.

11. The computer program product of claim 10, wherein the middleware user account is associated with a Project Lead responsible for establishing the middleware key and the root user account is associated with a Key Master responsible for establishing the root key.

12. The computer program product of claim 11, wherein the root security layer encrypts and stores the root key, and wherein the root security layer is prohibited from permanently storing the middleware key.

13. The computer program product of claim 9, wherein the result returned to the database application from the middle security layer includes one of: decrypted private data, a yes/no match, masked data or tokenized data.

14. The computer program product of claim 9, further comprising a crypto sentry that verifies all routines involved in passing the middleware key.

15. The computer program product of claim 9, wherein the program code that generates a hash includes a hashing routine that hashes the hash routine to further ensure integrity.

16. The computer program product of claim 9, wherein the middle security layer encrypts the middleware key when the middleware key is passed to the root security layer.

17. A computerized method for implementing a database security platform, comprising:

maintaining private data in an encrypted storage area;

providing a database application configured to receive queries from end users requiring access to encrypted private data, a middle security layer configured to handle predefined requests from the database application and a root security layer configured to decrypt and return private data to the middle security layer, wherein the middle security layer and root security level are not directly accessible by end users;

receiving a query at the database application that requires a request for private data, wherein the private data is not directly accessible by the database application and middle security layer;

generating a hash of a set of routines used to implement the middle security layer and the root security layer;

comparing the hash to a previously generated hash to verify the middle security layer and the root security layer;

verify that no active auditing is detected by monitoring for parameters passed among the database application, a middle security layer and a root security layer;

passing the request from the database application for private data to the middle security layer;

processing the request with a middleware routine at the middle security layer and submitting a decrypt request along with a middleware key to the root security layer;

retrieving and decrypting requested private data within the root security layer using a stored root key and the submitted middleware key;

passing decrypted private data to the middleware routine; and returning a decrypted result containing the decrypted private data to the database application.

18. The computerized method of claim 17, further comprising generating and comparing a hash of a hash routine used to hash the middle security layer and root security layer with a previously generated hash.

19. The computerized method of claim 17, wherein the middle security layer encrypts the middleware key when the decrypt request is submitted to the root security layer.

20. The computerized method of claim 17, wherein the root key is encrypted and stored by the root security layer and is decrypted when the root security layer receives a decrypt request.

21. The computerized method of claim 20, wherein the root key is decrypted with a hash of the middleware key.

* * * * *